(12) United States Patent
Otsuki (10) Patent No.: US 8,633,870 B2
(45) Date of Patent: Jan. 21, 2014

(54) WEARABLE DISPLAY

(75) Inventor: Masaki Otsuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 613 days.

(21) Appl. No.: 12/289,200

(22) Filed: Oct. 22, 2008

(65) Prior Publication Data

US 2009/0085833 A1    Apr. 2, 2009

Related U.S. Application Data

(63) Continuation of application No. PCT/JP2007/000387, filed on Apr. 11, 2007.

(30) Foreign Application Priority Data

Apr. 26, 2006    (JP) .................................. 2006-122409

(51) Int. Cl.
*G09G 5/00*    (2006.01)
(52) U.S. Cl.
USPC .................. 345/8; 345/9; 345/80; 455/550.1; 359/630; 359/633; 359/636; 359/631
(58) Field of Classification Search
USPC ......... 345/80, 6–9; 381/71.6, 375; 455/550.1; 455/550; 359/630, 633, 636, 631
See application file for complete search history.

(56) References Cited

U.S. PATENT DOCUMENTS

| | | | | |
|---|---|---|---|---|
| 5,003,300 | A * | 3/1991 | Wells | 345/8 |
| 7,068,242 | B2 * | 6/2006 | Kiyokawa | 345/8 |
| 2002/0149545 | A1 | 10/2002 | Hanayama et al. | |
| 2002/0190923 | A1 * | 12/2002 | Ronzani et al. | 345/50 |
| 2004/0021619 | A1 | 2/2004 | Kiyokawa | |

FOREIGN PATENT DOCUMENTS

| | | |
|---|---|---|
| JP | A-04-061495 | 2/1992 |
| JP | A-11-088800 | 3/1999 |
| JP | A-2002-232810 | 8/2002 |
| JP | A-2004-233780 | 8/2004 |
| WO | WO 01/37558 A1 | 5/2001 |

* cited by examiner

*Primary Examiner* — Lun-Yi Lao
*Assistant Examiner* — Shaheda Abdin
(74) *Attorney, Agent, or Firm* — Oliff & Berridge, PLC (57) ABSTRACT

A proposition is to provide a wearable display suitable for enjoying contents including images by plural users simultaneously. To realize the proposition, the wearable display provides an external output unit outputting a signal having the same contents as a signal input to a device to an external device, at an exterior part of an apparatus body including the device making information of contents including images into a state capable of being sensed by a user, and mounting fixtures mounting the device on a head portion of the user.

12 Claims, 6 Drawing Sheets

WEARABLE DISPLAY

CROSS-REFERENCE TO RELATED APPLICATION

This application is a Continuation Application of International Application No. PCT/JP2007/000387, filed Apr. 11, 2007, designating the U.S., in which the International Application claims a priority date of Apr. 26, 2006, based on prior filed Japanese Patent Application No. 2006-122409, the entire contents of which are incorporated herein by reference.

BACKGROUND

1. Field

The present invention relates to a head mountable image displaying apparatus (a wearable display).

2. Description of the Related Art

In recent years, a wearable display in which a displaying device such as a liquid crystal display element (LCD) is mounted on a head portion of a user is proposed. This wearable display is generally called as a head mount display (HMD) and so on (refer to Patent Document 1, and so on).

The user couples the HMD to a mobile media player (terminal) and so on, carries it, and thereby, it is possible to enjoy desired video contents at a place where the user has gone and so on (Patent Document 1: Japanese Unexamined Patent Application Publication No. 2002-232810).

In future, a requirement in which plural HMD users want to enjoy the same contents simultaneously may occur when the HMD users increase. However, an equipment branching a video signal output from the terminal, an equipment converting the video signal into a radio signal, and so on are necessary to realize the above-stated requirement by the conventional HMD.

SUMMARY

A proposition of the present invention is to provide a wearable display suitable for plural users to enjoy contents including images simultaneously.

To realize the above-stated proposition, a wearable display according to the present invention includes an apparatus body including a device making information of contents including images into a state capable of being sensed by a user and mounting fixtures mounting the device on a head portion of the user, and an external output unit outputting a signal having same contents as a signal input to the device to an external device, at an exterior part of the apparatus body.

Incidentally, a signal processing part performing a process for the signal output to the external device is included inside the apparatus body, and the signal processing part limits operations of the process during a period when the external device is not coupled to the external output unit.

Besides, the mounting fixtures are able to invert a direction of the device relative to the user, and an inverting processing part inverting only the signal input to the device between the signal input to the device and the signal output to the external device, in accordance with an inverting direction thereof when the direction is inverted, may be included inside the apparatus main body.

Besides, it is desirable that at least an image displaying device making the images included in the contents into a state capable of being sensed by one eye of the user, is included in the device.

Besides, it is desirable that the image displaying device making the images included in the contents into a state capable of being sensed by one eye of the user and an audio output device making audio included in the contents into a state capable of being sensed by left and right ears of the user are included in the device.

Besides, a memory part capable of storing files of the contents, and a signal reproducing part reproducing the files of the contents and generating the signal may be included inside the apparatus body.

Besides, an external input unit inputting the signal from the external device may be provided at the exterior part of the apparatus body.

DETAILED DESCRIPTION OF THE EMBODIMENTS

First Embodiment

A first embodiment of the present invention is described. The present embodiment is an embodiment of an HMD system.

First, an overall configuration of the present system is described.

Figure 1:
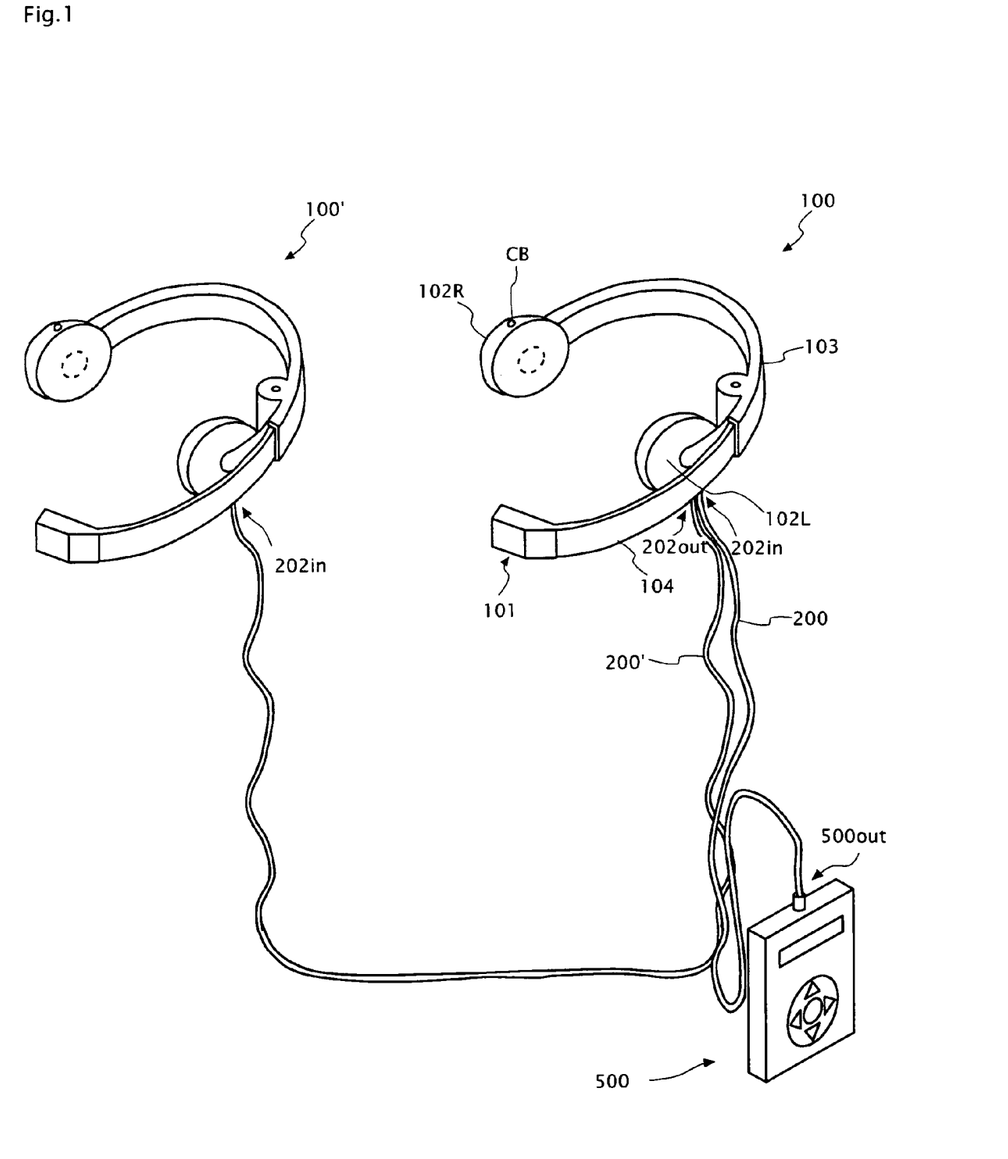
FIG. 1 is an embodiment of an HMD system of a first embodiment.

FIG. 1 is an overall configuration chart of the present system. As shown in FIG. 1, two HMD main bodies 100, 100' having the same configuration with each other, and a terminal 500 are included in the present system.

The HMD main body 100 includes left and right headphones 102L, 102R, a headband 103 supporting these headphones 102L, 102R, a side arm 104 coupled to the headband 103, a displaying unit 101 fixed at a tip portion of the side arm 104, and so on. The headband 103 presses the left and right headphones 102L, 102R to left and right ears of a user when this HMD main body 100 is mounted on a head portion of the user. The side arm 104 disposes the displaying unit 101 in front of one eye of the user in this state. Here, this eye is set to be a left eye, and it is called as a "viewing eye".

An operating button CB is provided on a case of the right headphone 102R, and an external input terminal $202_{in}$ and an external output terminal $202_{out}$ are provided on a case of the left headphone 102L, in this HMD main body 100. Among them, the external input terminal $202_{in}$ is coupled to an external output terminal 500out of the terminal 500 via a cable 200, and the external output terminal $202_{out}$ is coupled to an external input terminal $202_{in}$ of the HMD main body 100' via a cable 200'.

Incidentally, each of the external input terminals $202_{in}$, the external output terminal $202_{out}$, and the external output terminal 500out has at least three kinds of electric contacts to transmit/receive later-described video signal and left/right audio signals, and connectors complying with these terminals are provided at both ends of the cables 200, 200'.

Files such as video/audio contents, audio contents, video contents, still image contents are stored inside the terminal 500, and various kinds of operating buttons are provided at a surface of the terminal 500. It is possible for the user to specify any of the contents to give a reproduction indication thereof to the terminal 500 by operating these operating buttons. When certain contents are specified and the reproduction indication is given, the terminal 500 reproduces the file of the contents, generates a contents signal, and outputs the contents signal to the HMD main body 100 in a generation sequence.

Here, when a subject of reproduction is the video/audio contents, the contents signals become a video signal and left/right audio signals (all of them are analog signals) generated in parallel. Besides, when the subject of reproduction is the audio contents, the contents signals become the left/right audio signals (both of them are analog signals) generated in parallel. Besides, when the subject of reproduction is the video contents, the contents signal becomes the video signal (analog signal). Besides, when the subject of reproduction is the still image contents, the contents signal becomes the video signal for still images (analog signal).

Hereinafter, it is described that the subject of reproduction is the video/audio contents, and the contents signals are the video signal and the left/right audio signals generated in parallel.

Next, an internal configuration and operations of the HMD main body 100 are described.

Figure 2:
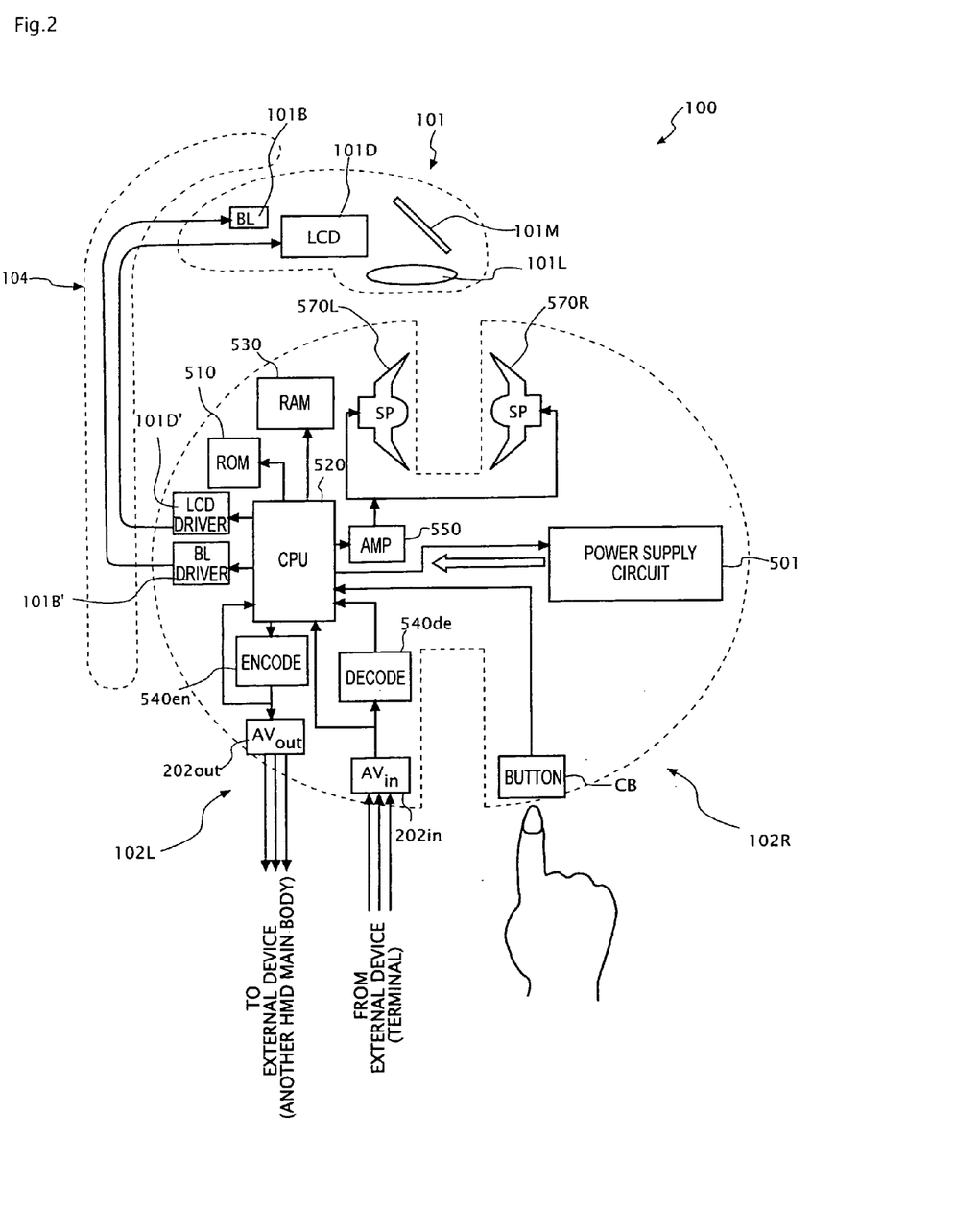
FIG. 2 is a block diagram showing an internal configuration of an HMD main body 100 of the first embodiment.

FIG. 2 is a block diagram showing an internal configuration of the HMD main body 100. In FIG. 2, elements which are the same as those in FIG. 1 are shown by the same reference numerals.

A lens 101L, a mirror 101M, an LCD (liquid crystal display element) 101D, a backlight 101B, and so on are disposed sequentially from the viewing eye side, inside a case of the displaying unit 101. The LCD 101D is to make the video signal into video information capable of being sensed by the viewing eye. The lens 101L has a function to form a magnified virtual image of the LCD 101D behind the displaying unit 101.

A left speaker 570L, a CPU 520, a RAM 530 used for a work of the CPU 520, a ROM 510 storing operation programs of the CPU 520, an encoder 540en and a decoder 540de complying with a standard such as an NTSC, an LCD driver 101D', a backlight driver 101B', an amplifier 550, and so on are disposed inside the case of the left headphone 102L. Besides, the external input terminal $202_{in}$ and the external output terminal $202_{out}$ are provided on the case of the left headphone 102L, as stated above.

A right speaker 570R, a power supply circuit 501, and so on are disposed inside the case of the right headphone 102R. The power supply circuit 501 supplies necessary power to respective parts of the HMD main body 100 under an indication of the CPU 520. Besides, the operating button CB is provided on the case of the right headphone 102R as stated above. The user operates this operating button CB to give an indication to the HMD main body 100.

Incidentally, disposition destinations of elements other than the lens 101L, the mirror 101M, the LCD 101D, the backlight 101B, the speakers 570L, 570R may be changed in the above-stated HMD main body 100.

The video signal and the left/right audio signals are input in parallel from an external device (terminal 500) coupled thereto to the external input terminal $202_{in}$. These video signal and the left/right audio signals are digitally processed in parallel at the decoder 540de, and thereafter, downloaded to the CPU 520. The CPU 520 transmits the video signal to the LCD driver 101D', and transmits the left/right audio signals to the amplifier 550.

The LCD driver 101D' converts the given video signal into an appropriate modulating signal, gives it to the LCD 101D, and performs a time modulation of a transmissivity distribution of the LCD 101D. At this time, the backlight 101B is lighted by the backlight driver 101B' with appropriate intensity. Accordingly, video is displayed on a front surface of the LCD 101D, and the video capable of being sensed by the viewing eye of the user is supplied from the HMD main body 100.

The amplifier 550 performs an amplifying process of the given left/right audio signals in parallel, and thereafter, transmits the left audio signal to the speaker 570L, and transmits the right audio signal to the speaker 570R. Accordingly, audio is output from the speakers 570L, 570R, and the audio capable of being sensed by the left and right ears of the user is supplied from the HMD main body 100.

Besides, the CPU 520 transmits the video signal which is the same as the one transmitted to the LCD driver 101D' and the left/right audio signals which are the same as the ones transmitted to the amplifier 550, to the encoder 540en in parallel. These video signal and the left/right audio signals are analog processed in parallel at the encoder 540en, then given to the external output terminal $202_{out}$, and output to an external device (HMD main body 100') which is coupled thereto in parallel.

Further, the above-stated operations of the HMD main body 100 are similarly applicable for another HMD main body 100' (refer to FIG. 1). Accordingly, the HMD main body 100' supplies the video and audio to the user in accordance with the video signal and the left/right audio signals transmitted from the coupled external device (HMD main body 100) in parallel. The video and audio supplied to the user of the HMD main body 100' at a certain timing are the same as the ones supplied to the user of the HMD main body 100 at approximately the same timing.

Accordingly, it is possible to let the user of the HMD main body 100 and the user of the HMD main body 100' enjoy the same video/audio contents simultaneously only by coupling the HMD main body 100 and the HMD main body 100' properly in the present system.

Modified Example of First Embodiment

Incidentally, two HMD main bodies having the same constitution are coupled with each other in the present system, but three or more HMD main bodies having the same constitution as the above may be coupled with each other. Accordingly, it is possible to let three or more users enjoy the same video/audio contents simultaneously.

Besides, the HMD main body 100 of the present system transmits the contents signals (here, the video signal and the left/right audio signals) input from outside to outside via the CPU 520, but the contents signals may be transmitted to outside as they are not via the CPU 520.

Besides, the ROM 510 is to store the operation programs of the CPU 520 in the HMD main body 100 of the present system, but the files of the contents may be stored in the ROM 510 while using a large-capacity, rewritable memory (flash memory and so on) as the ROM 510. In this case, a function reproducing the file to generate the contents signal is given to the CPU 520 of the HMD main body 100. Besides, in this case, the HMD main body 100 may output the contents signal generated internally to outside instead of outputting the contents signal input from outside to outside.

Besides, a coupling terminal to couple to an information terminal such as a computer and so on, and to transmit/receive the files of the contents between the information terminal is provided at the HMD main body 100, when the files of the contents are stored in the ROM 510.

Besides, the HMD main body 100 of the present system includes the speakers 570L, 570R, but they may not be given if it is not necessary to supply audio to the user. In this case, the circuit relating only to the audio (amplifier 550) may not be given within the HMD main body 100.

Second Embodiment

A second embodiment of the present invention is described. The present embodiment is a modified example of the HMD main body 100 of the first embodiment. Here, only different points from the HMD main body 100 of the first embodiment are described. The different points exist in the operations of the CPU 520.

Figure 3:
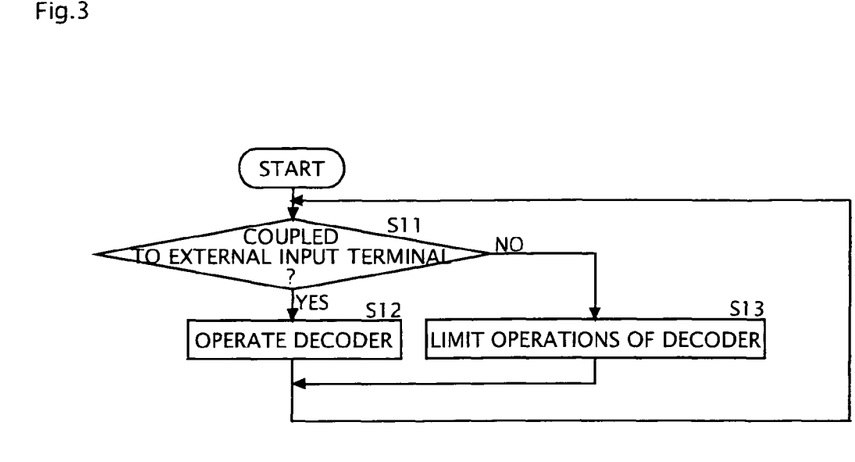
FIG. 3 is an operation flowchart of a CPU 520 of a second embodiment.

FIG. 3 is an operation flowchart of the CPU 520 of the present embodiment. As shown in FIG. 3, the CPU 520 begins to monitor whether the external input terminal $202_{in}$ is coupled to an external device or not based on a coupling state of the external input terminal $202_{in}$ (step S11), when power of the HMD main body 100 is turned on, and the power supply to the respective parts of the HMD main body 100 is started.

The CPU 520 continues the power supply for the decoder 540de (step S12) during a period when the external input terminal $202_{in}$ is coupled to the external device (terminal 500) (YES in step S11). At this time, the supply of the video and audio (supply of contents) from the HMD main body 100 to the user becomes possible. Incidentally, a supply method of the contents for the user is as same as it is described in the first embodiment.

On the other hand, the CPU 520 stops the power supply for the decoder 540de (step S13) during the period when the external device (terminal 500) is not coupled to the external input terminal $202_{in}$ (NO in step S11). At this time, the supply of the contents from the HMD main body 100 to the user becomes impossible.

Besides, the CPU 520 controls the encoder 540en as same as the control relating to the decoder 540de as stated above (The flow thereof is the same as in FIG. 3, and the drawing is not given). Namely, the CPU 520 monitors whether the external output terminal $202_{out}$ is coupled to the external device or not based on a coupling state of the external output terminal $202_{out}$.

The CPU 520 continues the power supply for the encoder 540en during the period when the external output terminal $202_{out}$ is coupled to the external device (HMD main body 100'). At this time, an output of a video signal and audio signals (output of contents signals) from the HMD main body 100 to the external device becomes possible. Incidentally, an output method of the contents signals for the external device is as same as it is described in the first embodiment.

On the other hand, the CPU 520 stops the power supply for the encoder 540en during the period when the external device is not coupled to the external output terminal $202_{out}$. At this time, the output of the contents signals from the HMD main body 100 to the external device becomes impossible.

As stated above, the HMD main body 100 of the present embodiment limits the operations of the encoder 540en and the decoder 540de to the minimum, and therefore, a power consumption thereof can be reduced.

Incidentally, subjects of limitation of the power supply are set to be both the encoder 540en and the decoder 540de in the HMD main body 100 of the present embodiment, but it may be either one of them.

Third Embodiment

A third embodiment of the present invention is described. The present embodiment is a modified example of the HMD main body 100 of the first embodiment. Here, only different point from the HMD main body 100 of the first embodiment is described. The different point exists in a point that it is configured such that a switching of the viewing eye is possible.

Figure 4A:
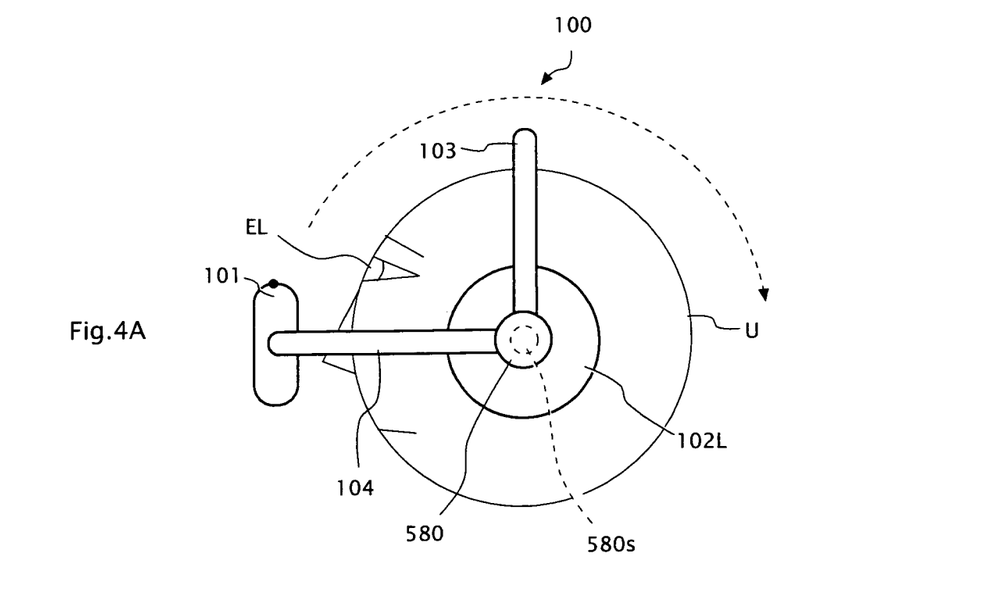
FIG. 4A and FIG. 4B are exterior views (schematic views) of the HMD main body 100 of a third embodiment.

FIG. 4A is an exterior view (schematic view) of the HMD main body 100 of the present embodiment, and an appearance in which a user U wearing the HMD main body 100 is viewed from a lateral direction is shown.

Figure 4B:
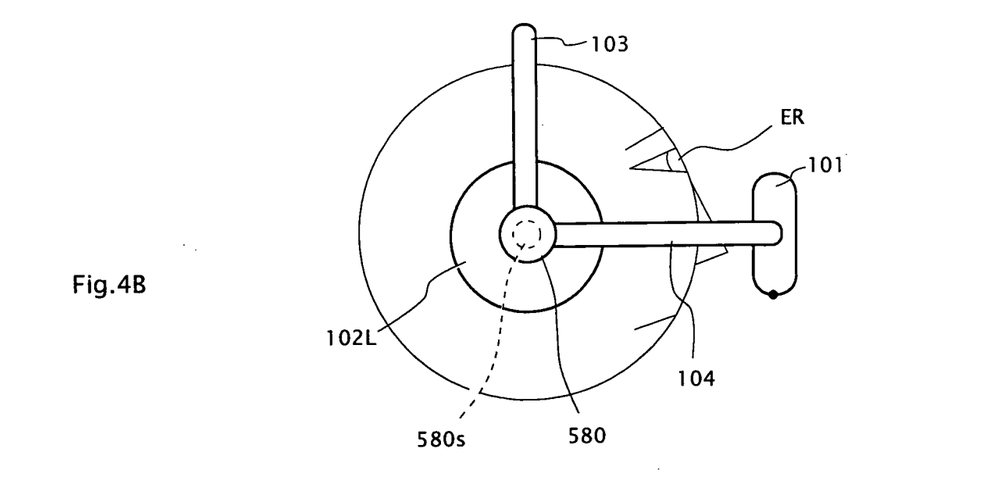

As shown in FIG. 4A, the HMD main body 100 of the present embodiment has a turning mechanism 580 between the side arm 104 and the left headphone 102L, and the side arm 104 can turn within an angle range of approximately 180° while using a line coupling between the left and right headphones (a line in a front-rear direction of a page space) as a turning axis resulting from a motion of the turning mechanism 580, as shown by a dotted arrow in FIG. 4A. An appearance of the HMD main body 100 after it is turned 180° is shown in FIG. 4B.

Hereinafter, a state of the HMD main body 100 shown in FIG. 4A (=a turning angle of the side arm 104 is in a vicinity of 0°) is set as a "standard state", and a state of the HMD main body 100 shown in FIG. 4B (=the turning angle of the side arm 104 is in a vicinity of 180°) is set as an "inverted state".

Besides, whether the HMD main body 100 is in the standard state or in the inverted state is detected by a sensor 580s provided in a vicinity of the turning mechanism 580. This sensor 580s is, for example, a mechanical switch which is turned on (or turned off) only when the turning angle of the side arm 104 is 90° or more.

The user U of the HMD main body 100 sets the HMD main body 100 in the standard state (FIG. 4A), and wears the HMD main body 100 on a head portion so that the left headphone 102L is in contact with the left ear and the right headphone is in contact with the right ear, when the user U views the video with a left eye EL.

On the other hand, the user U of the HMD main body 100 sets the HMD main body 100 in the inverted state (FIG. 4B), and wears the HMD main body 100 on the head portion so that the left headphone 102L is in contact with the right ear and the right headphone is in contact with the left ear, when the user U views the video with a right eye ER.

Accordingly, when it is viewed from the user U side, up, down, left and right of the displaying unit 101 are inverted and left and right of the headphone are inverted when the user U views the video with the right eye (FIG. 4B).

Figure 5:
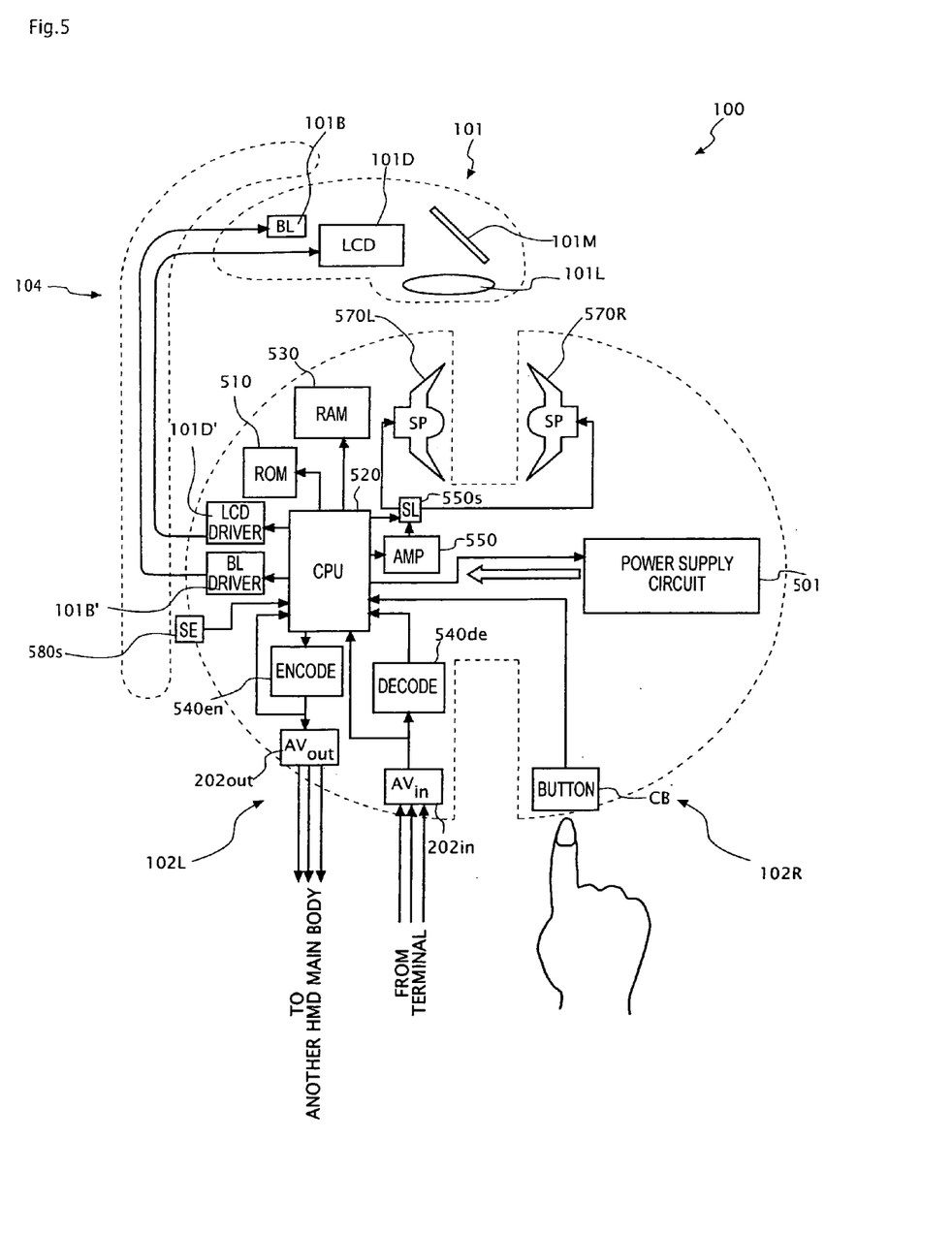
FIG. 5 is a block diagram showing an internal configuration of the HMD main body 100 of the third embodiment.

FIG. 5 is a block diagram showing an internal configuration of the HMD main body 100 of the present embodiment. In FIG. 5, elements which are the same as those in FIG. 2 are shown by the same reference numerals. As shown in FIG. 5, a selector 550s is inserted at an output side of the amplifier 550, and an output of the sensor 580s is coupled to the CPU 520, in the HMD main body 100 of the present embodiment.

It is possible for the CPU 520 to monitor the output of the sensor 580s, and to recognize whether the HMD main body 100 is in the standard state or not.

Besides, it is possible for the CPU 520 to switch a transmission destination of the right audio signal and a transmission destination of the left audio signal between the right speaker 570R and the left speaker 570L by giving an indication to the selector 550s. The audio supplied from the speakers 570R, 570L to the user is inverted between left and right, resulting from this switching.

Besides, it is possible for the CPU 520 to indicate the LCD driver 101D' to invert an output destination of the modulating signal among up, down, left and right. The video supplied from the LCD 101D to the user inverts among up, down, left and right resulting from this inversion.

Consequently, the CPU 520 may perform the inversion of the contents as stated above when the HMD main body 100 shifts from the standard state (FIG. 4A) to the inverted state (FIG. 4B). Accordingly, it is possible for the HMD main body 100 to provide the information of the contents to the user in a proper direction in either case when the viewing eye is left or right.

Figure 6:
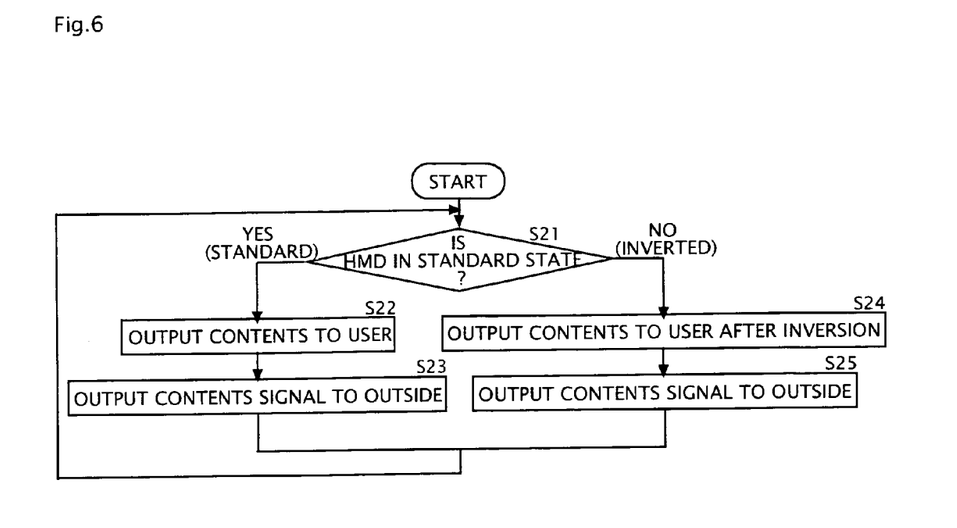
FIG. 6 is an operation flowchart of the CPU 520 of the third embodiment.

FIG. 6 is an operation flowchart of the CPU 520 of the present embodiment. As shown in FIG. 6, the CPU 520 of the present embodiment monitors whether the HMD main body 100 is in the standard state or not based on the output of the sensor 580s (step S21).

The CPU 520 supplies the contents to the user (step S22) and outputs the contents signal of the same contents to outside (step S23) as same as in the first embodiment, during the period when the HMD main body 100 is in the standard state (YES in step S21).

On the other hand, the CPU 520 inverts the contents supplied to the user as stated above (step S24) and outputs the contents signal of the same contents before the inversion to outside (step S25) during the period when the HMD main body 100 is in the inverted state (NO in step S21).

As stated above, the HMD main body 100 of the present embodiment can switch the viewing eyes, and has the function to invert the contents in accordance with the switching of the viewing eyes. However, the switching is not reflected on the contents signal transmitted to outside.

Consequently, it is possible for the HMD main body 100 of the present embodiment to provide the contents to the user in the proper direction, and it is also possible to prevent a possibility of malfunction of the coupled HMD main body 100' (refer to FIG. 1).

Incidentally, in the HMD main body 100 of the present embodiment, the switching method of the viewing eye is not limited to the above-stated method (the method in which the side arm is turned 180°), but, for example, any of the methods described in Japanese Unexamined Patent Application Publication No. 2004-233780 can be adopted.

Besides, the present embodiment is the modified example of the HMD main body 100 of the first embodiment, but the HMD main body 100 of the second embodiment may be modified similarly.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A wearable display comprising:
a device configured to provide contents including an image to a first user by making a signal of said contents into a state capable of being sensed by said user;
mounting fixtures configured to mount said device on a head portion of said first user;
an external input unit configured to input a signal of contents including an image from an external wearable display of a second user, said external wearable display having a same constitution as the wearable display;
an external output unit configured to output a signal of contents including an image to said external wearable display of said second user; and
a processing part configured to provide said signal input by said external input unit to said device and configured to provide to said external output unit, in real time, a signal having a same contents as said signal being input by said external input unit, wherein
said mounting fixtures are capable of inverting a mounting direction of said device relative to said first user,
when said mounting direction is inverted, said processing part performs an inverting processing on said signal to be provided to said device so that a provided direction of said contents inverts, while not performing said inverting processing on said signal to be provided to said external output unit, and
said external wearable display comprises:
    mounting fixtures configured to mount a device providing contents to said second user on a head portion of said second user and being capable of inverting a mounting direction of said device relative to said second user; and
    a processing part configured to perform an inverting processing on a signal to be provided to said device so that a provided direction of said contents inverts when said mounting direction is inverted.

2. The wearable display according to claim 1, wherein
the processing part is included inside said wearable display, and
during a period when said external wearable display is not coupled to said external output unit, said processing part limits said providing to said external output unit, in real time, of said signal having said same contents as said signal being input by said external input unit.

3. The wearable display according to claim 1, wherein
at least an image displaying device making images included in said contents into a state capable of being sensed by one eye of said first user is included in said device.

4. The wearable display according to claim 3, wherein
an audio output device making audio included in said contents into a state capable of being sensed by left and right ears of said first user is included in said device.

5. The wearable display according to claim 1, wherein
a memory part capable of storing files of said contents, and
a signal reproducing part reproducing the files of said contents and generating said signal are included inside said wearable display.

6. The wearable display according to claim 1, wherein
the wearable display is coupled to at least one other external wearable display.

7. The wearable display according to claim 1, wherein
said external output unit is configured to output said signal of contents including an image to a second external wearable display of a third user, said second external wearable display having the same constitution as the wearable display.

8. The wearable display according to claim 1, wherein
said external input unit is also configured to input a signal of contents including an image from another external device.

9. The wearable display according to claim 1, wherein the structure of said wearable display is substantially identical to that of said external wearable display.

10. A display system having a plurality of wearable displays, the display system comprising:
   a first wearable display and a second wearable display of the plurality of wearable displays, the first wearable display having:
      a device configured to provide contents including an image to a first user by making a signal of said contents into a state capable of being sensed by said first user,
      mounting fixtures configured to mount said device on a head of said first user,
      an external input unit configured to input a signal of contents including an image from said second wearable display, said second wearable display being of a second user,
      an external output unit configured to output a signal of contents including an image to said second wearable display, and
      a processing part configured to provide said signal input by said external input unit to said device and configured to provide to said external output unit, in real time, a signal having a same contents as said signal being input by said external input unit, wherein
      said mounting fixtures are capable of inverting a mounting direction of said device relative to said first user,
      when said mounting direction is inverted, said processing part performs an inverting processing on said signal to be provided to said device so that a provided direction of said contents inverts, while not performing said inverting processing on said signal to be provided to said external output unit, and
   said second wearable display has a same constitution as the first wearable display comprises:
      said mounting fixtures being capable of inverting a mounting direction of said device relative to a second user; and
      a processing part configured to perform an inverting processing on a signal to be provided to said device so that a provided direction of said contents inverts when said mounting direction is inverted.

11. The display system according to claim 10, wherein said external input unit is also configured to input a signal of contents including an image from another external device.

12. The display system according to claim 10, wherein the structure of said first wearable display is substantially identical to that of said second wearable display.

* * * * *